United States Patent
Brown

(10) Patent No.: US 6,773,351 B2
(45) Date of Patent: Aug. 10, 2004

(54) COLLECTABLE ELECTRONIC MULTIMEDIA TRADING CARD AND PORTABLE CARD READER

(76) Inventor: Merlyn Brown, 1346 New York, Lawrence, KS (US) 66044

( * ) Notice: Subject to any disclaimer, the term of this patent is extended or adjusted under 35 U.S.C. 154(b) by 90 days.

(21) Appl. No.: 10/154,760

(22) Filed: May 24, 2002

(65) Prior Publication Data

US 2003/0220144 A1 Nov. 27, 2003

(51) Int. Cl.[7] .................................................. A63F 9/24
(52) U.S. Cl. ........................................... 463/43; 463/42
(58) Field of Search .............................. 463/1, 30, 31, 463/32, 33, 34, 35, 37, 39, 40, 41, 42, 43, 44, 45, 46, 47; 273/236–238, 148 A; 40/445, 124.01

(56) References Cited

U.S. PATENT DOCUMENTS

| | | | | |
|---|---|---|---|---|
| 5,533,124 A | * | 7/1996 | Smith et al. | 705/57 |
| 5,743,801 A | * | 4/1998 | Welander | 463/44 |
| 2002/0015027 A1 | * | 2/2002 | Lee et al. | 345/204 |
| 2003/0055713 A1 | * | 3/2003 | Pinto et al. | 705/10 |

* cited by examiner

Primary Examiner—Kim Nguyen
(74) Attorney, Agent, or Firm—Hovey Williams LLP

(57) ABSTRACT

A collectable electronic multimedia trading card (10) and a hand-held portable card reader (12) for storing and communicating an information set of information relating to a single specific person, place, or thing. In a preferred embodiment, the card (10) is no more than between approximately 3.00 inches and 3.25 inches in length, no more than between approximately 2.30 and 2.70 inches in width, and no more than between approximately 0.01 inch and 0.1 inches in thickness. The information is presented using a variety of media elements, such as, for example, video, audio, still, and text elements. The information includes hyperlinks to additional network-accessible external sources of information. The information also includes advertisements.

24 Claims, 4 Drawing Sheets

COLLECTABLE ELECTRONIC MULTIMEDIA TRADING CARD AND PORTABLE CARD READER

BACKGROUND OF THE INVENTION

1. Field of the Invention

The present invention relates broadly to mechanisms for providing information regarding a person, a place, or a thing in a collectable trading card or trading card-like format. More particularly, the present invention concerns a collectable electronic multimedia trading card and a hand-held portable card reader for storing and communicating an information set of information relating to a single specific person, place, or thing, wherein the card is approximately the same size as a conventional paper trading card, and wherein the information is presented using a variety of media elements, such as, for example, video, audio, still, and text elements, and wherein the information includes one or more hyperlinks and advertisements.

2. Description of the Prior Art

Trading cards exist that provide limited information (e.g., performance statistics, performance tips, sponsorships) relating to a person (e.g., athlete, performer, celebrity, politician), a place (e.g, country), or a thing (e.g., automobile, aircraft, water craft). Such prior art cards are typically provided on paper, cardstock, or metal measuring approximately 3.5 inches in length and approximately 2.5 inches in width. It is often desirable to collect and trade these prior art cards for a variety of reasons, such as, for example, their historical or nostalgic value or their investment value. It will be appreciated, however, that these prior art cards are substantially limited with regard to the amount of information they are able to present and the manner in which it can be presented.

Collectible trading cards are known, for example, each of which provides limited information regarding a single professional athlete, typically including, for example, historical performance statistics. The presentation of information is typically limited to one or more tables or charts setting forth the historical performance statistics and to a single photograph depicting the athlete. It will be appreciated that no space or capacity remains for more detailed or additional information, or for other information about the athlete, or for any substantial amount of advertising. Furthermore, no mechanism exists for presenting the information using media elements other than text and still pictures, photographs, or other graphics.

Due to the aforementioned problems and disadvantages in the prior art, a need exists for an improved mechanism for providing information of a trading card-like nature in a trading card or trading card-like format.

SUMMARY OF THE INVENTION

The present invention overcomes the above-identified and other problems and disadvantages in the prior art by providing a collectable electronic multimedia trading card and a hand-held portable card reader for storing and communicating an information set of information relating to a single specific person, place, or thing. In a preferred embodiment, the card is based on an electronic data storage medium in the form of a miniature computer-readable compact disk (CD-ROM) or digital video disk (DVD) no more than between approximately 3.00 inches and 3.25 inches in length, no more than between approximately 2.30 and 2.70 inches in width, and no more than between approximately 0.01 inch and 0.1 inches in thickness so as to substantially correspond to the size of a prior art paper trading card. As desired, the card may be shaped to suggest some aspect of the subject of the card.

The information may include a number of information subsets, including, for example, a performance subset; a biographical subset; an equipment subset; a sponsorship subset; and a performance tips subset. The performance subset includes performance operation information of an appropriate nature, scope, and format. The biographical subset includes biographical or other historical information related to, for example, the life, development, or evolution of the subject of the card. The equipment subset includes information related to any equipment used by or on the subject of the card, including, for example the nature, type, cost, and availability of such equipment. The sponsorship subset includes information related to any sponsors or supporters of or donors to the subject of the card, including, for example, corporate and private sponsors and donors. The performance tips subset includes information provided by or relating to the subject of the card for enhancing performance in some appropriate manner.

Each card also preferably includes a links component and an advertising component. The links component preferably includes one or more hyperlinks to Internet-accessible or other network-accessible external sources of additional information related to the subject of the card or to a subject of the information set or subsets. The advertising component preferably includes one or more advertisements, such as, for example, standalone, static, dynamic, full page, banner, or hyperlinked advertisements.

The information set and subsets may be presented using a variety of media elements, such as, for example, video movie elements; audio elements; still picture or photographic or other graphic elements; text elements; interactive hyperlink elements; and advertising elements. The video movie element includes one or more video clips of, for example, the subject of the card in action. The audio element may, though not necessarily, be coupled with the video element to provide an audible accompaniment thereto. The still picture or photograph or other graphic elements may include one or more photographs or renderings of the subject or an aspect thereof. The text element includes a textual presentation or discussion of information related to the subject or an aspect thereof. The interactive hyperlinking element includes one or more hyperlinks to Internet-accessible or other network-accessible external sources of additional information related to the subject of the card or to a subject of the information set or subsets. The advertising element includes one or more advertisements.

Thus, it will be appreciated that the card of the present invention provides a number of substantial advantages over prior art trading cards, including, for example, allowing for substantially greater quantity and diversity of presentation of the information stored thereon. Thus, whereas prior art paper or metal trading cards were limited to a relatively small amount of text and a few small graphics, the card is able to advantageously store a detailed multimedia presentation combining a variety of media elements. Furthermore, the card's increased capacity and network connectivity advantageously allow for an advertising component and corresponding revenue which could potentially be used to offset the card's manufacturing costs. Additionally, the card is approximately the same size as prior art trading cards, making it conveniently portable, enhancing its tradeability, and allowing for its use with existing materials designed for use with the prior art trading cards, such as, for example, individual and sheets of protective clear plastic sleeves and card holders or bins. Additionally, the card is advantageously accessible using any conventional computer-based CD-ROM drive, such as might be found, for example, in a commonly available desktop or portable computer. Additionally, in order to enhance convenience of use and tradeability, the information stored on the card can be advantageously retrieved and communicated using the hand-held portable card reader.

These and other important aspects of the present invention are more fully described in the section entitled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
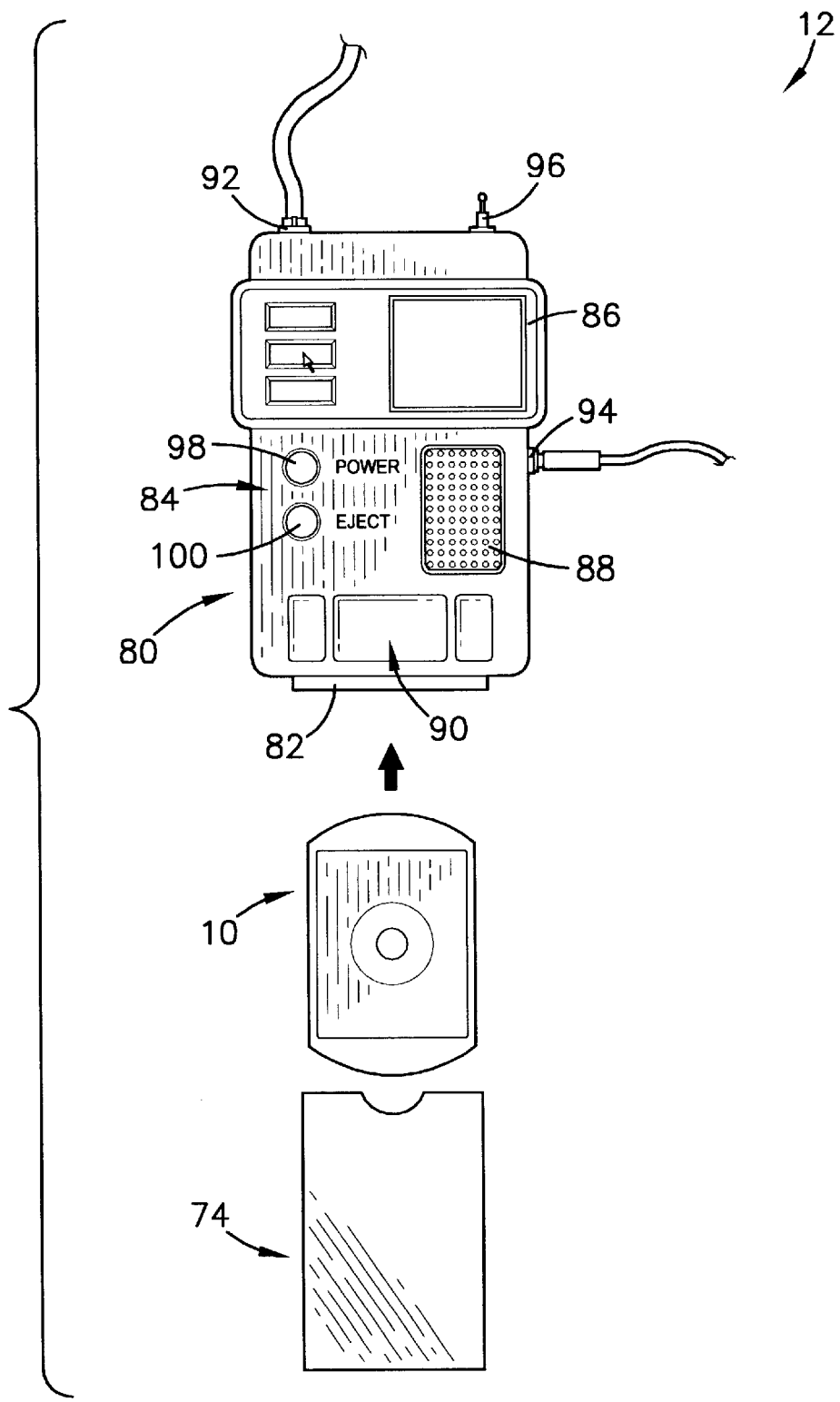
FIG. 1 is a frontal view of a preferred embodiment of the card and the hand-held portable card reader of the present invention.

Referring to FIG. 1, a collectable electronic multimedia trading card 10 is shown constructed in accordance with a preferred embodiment of the present invention. The card 10 is adapted to receive, store, and provide for playback an information set of information relating to a person, place, or thing, wherein the information is presented using a variety of media elements, such as, for example, video, audio, still, and text elements. The subject of the card 10 may be any single specific person (e.g., athlete, performer, celebrity, politician), place (e.g., country, city/town), or thing (e.g., automobile, aircraft, watercraft). Also shown is a hand-held portable card reader 12 which may be used to retrieve and communicate the information stored on the card 10.

In one preferred embodiment, the card 10 is based on an electronic data storage medium in the form of a miniature computer-readable compact disk (CD-ROM) or digital video disk (DVD) approximately 3.125 inches long, 2.500 inches wide, and 0.0313 inch thick, with substantially straight sides and curved ends, and operable to be received within the inner circular slot of a conventional and commonly available CD/DVD player or drive. More generally, the card 10 is preferably no more than between approximately 3.00 inches and 3.25 inches in length, no more than between approximately 2.30 and 2.70 inches in width, and no more than between approximately 0.01 inch and 0.1 inches in thickness so as to substantially correspond to the size of a prior art paper trading card. As desired, the card 10 may be shaped to suggest some aspect of the subject of the card 10. For example, where the subject is a football player, the card 10 might be shaped to substantially resemble a profile of a football; or where the subject relates to vehicle racing, the card 10 might be shaped to substantially resemble a profile of a specific type of vehicle (e.g., boat, automobile, truck).

Where the card 10 is a CD-ROM, its capacity may be, for example, approximately 50 MB, which is sufficient to store between four and ten brief video movie clips, a number of audio clips, and a relatively large amount of text and still pictures, photographs, or other graphics. Furthermore, the information set may be compressed using conventional compression techniques in order to maximize storage capacity. It will be appreciated, however, that future technological advances may provide alternative storage mediums or larger capacities, and that, therefore, the present invention should be considered independent of any particular storage medium or capacity.

Each card 10 will receive and store in a retrievable electronic form the information set of information related to the single specific subject, whether a person, a place, or a thing. As mentioned, the subject may be, for example, a single person such as a single athlete, a single entertainer, or a single politician, or it may be a single vehicle, a single country, a single city, or a single animal. It will be appreciated that limiting the scope of the information to such a specific single subject is essential to the collectability and tradeability of the card 10 in that multiple cards are needed to complete a coherent set of cards. Thus, for example, where each card 10 stores information related to a single athlete, a coherent set of such cards 10 may consist of all of the athletes on a single team.

The information of the information set may include a number of information subsets, including, for example, a performance subset; a biographical subset; an equipment subset; a sponsorship subset; and a performance tips subset. It will be appreciated that the inclusion and contents of any particular information subset will depend heavily on the nature of the subject of the card 10. Similarly, other appropriate information subsets not specifically disclosed herein may be devised and included. The performance subset includes performance operation information of an appropriate nature, scope, and format. Thus, for example, where the subject is an athlete, the performance subset may include a performance history and historical performance statistics; or where the subject is an automobile, the performance subset may include top speeds, acceleration data, and racing statistics, as appropriate.

The biographical subset includes biographical or other historical information related to, for example, the life, development, or evolution of the subject of the card 10. Thus, for example, where the subject is a politician, the biographical subset may include a life and family history; or where the subject is an animal, the biographical subset may include evolutionary and behavior data; or where the subject is a racing boat, the biographical subset may include development and construction information.

The equipment subset includes information related to any equipment used by or on the subject of the card 10, including, for example the nature, type, cost, and availability of such equipment. Thus, for example, where the subject is an athlete, the equipment subset may include uniform, padding, and shoe information; or where the subject is a professional fisherman, the equipment subset may include tackle, outfitter, and boat information.

The sponsorship subset includes information related to any sponsors or supporters of or donors to the subject of the card 10, including, for example, corporate and private sponsors and donors. Thus, for example, where the subject is an athlete, the sponsorship subset may include corporate sponsorship information; or where the subject is a politician, the sponsorship subset may include party affiliation and major supporter and donor information.

The performance tips subset includes information provided by or relating to the subject of the card 10 for enhancing performance in some appropriate manner. Thus, for example, where the subject is an athlete, the performance tips subset may include one or more performance tips provided by the athlete for enhancing or otherwise improving performance in the athlete's sport; or where the subject is an animal, the performance tips subset may include information related to raising, caring for, or managing the animal.

Each card 10 will also preferably include a links component and an advertising component. These need not be related to the subject of the card 10 though it is contemplated that at least a portion of the links and advertisements will be. The links component preferably includes one or more hyperlinks to Internet-accessible or other network-accessible external sources of additional information related to the subject of the card 10 or to a subject of the information set or subsets. Thus, for example, where the subject is an athlete and the information set includes an equipment subset, one or more hyperlinks to the equipment manufacturers' websites may be included. Similarly, where the subject is a politician and the information set includes a sponsorship subset, one or more hyperlinks to the major donors' or supporters' websites may be included.

The advertising component preferably includes one or more advertisements, such as, for example, standalone, static, dynamic, full page, banner, or hyperlinked advertisements. Space and technology limitations heretofore limited the use of advertising on prior art paper trading cards, but the increased capacity, multi-media, and hyperlinking ability of the present invention allow for advertising as a means of additional revenue. Such additional revenue, it will be appreciated, may in turn be used to offset the cost of manufacturing and purchasing the cards 10 and thereby further enhance their tradeability. Thus, for example, where the subject of the card 10 is an athlete, the advertising component may include advertisements by ticket promoters, equipment manufacturers, and nutritional food, drink, or supplement providers. Similarly, where the subject is an animal, the advertising component may include advertisements for breeders, zoos, or publishers of printed materials related to raising and caring for the animal.

As mentioned, a substantial advantage of the card 10 of the present invention over prior art paper trading cards is its ability to present the information of the information set and subsets using a variety of media elements, such as, for example, video movie elements; audio elements; still picture or photographic or other graphic elements; text elements; interactive hyperlink elements; and advertising elements. It will be appreciated that the inclusion and contents of any particular media element will depend heavily on the nature of the subject of the card 10. Similarly, other appropriate media elements not specifically disclosed herein may be devised and included. The information set or each subset may include any number and combination of these elements in its presentation of information.

The video movie element includes one or more video clips of, for example, the person or thing in action. The audio element may, though not necessarily, be coupled with the video element to provide an audible accompaniment thereto. Alternatively, the audio element may consist solely of, for example, an audible speech or play-by-play announcement.

The still picture or photograph or other graphic elements may include one or more photographs or renderings of the subject or an aspect thereof. The text element includes a textual presentation or discussion of information related to the subject or an aspect thereof, which may include, for example, a table or chart of performance statistics, a family tree, or manufacturing and construction specifications. The interactive hyperlinking element includes one or more hyperlinks to Internet-accessible or other network-accessible external sources of additional information related to the subject of the card 10 or to a subject of the information set or subsets. The advertising element includes one or more advertisements.

The hyperlink and advertising elements are included in addition to the links and advertising component described above to emphasize that hyperlinks and advertisements may be both interspersed through out the presentation of information and provided in the form of standalone links or advertisement presentations or pages.

Figure 2:
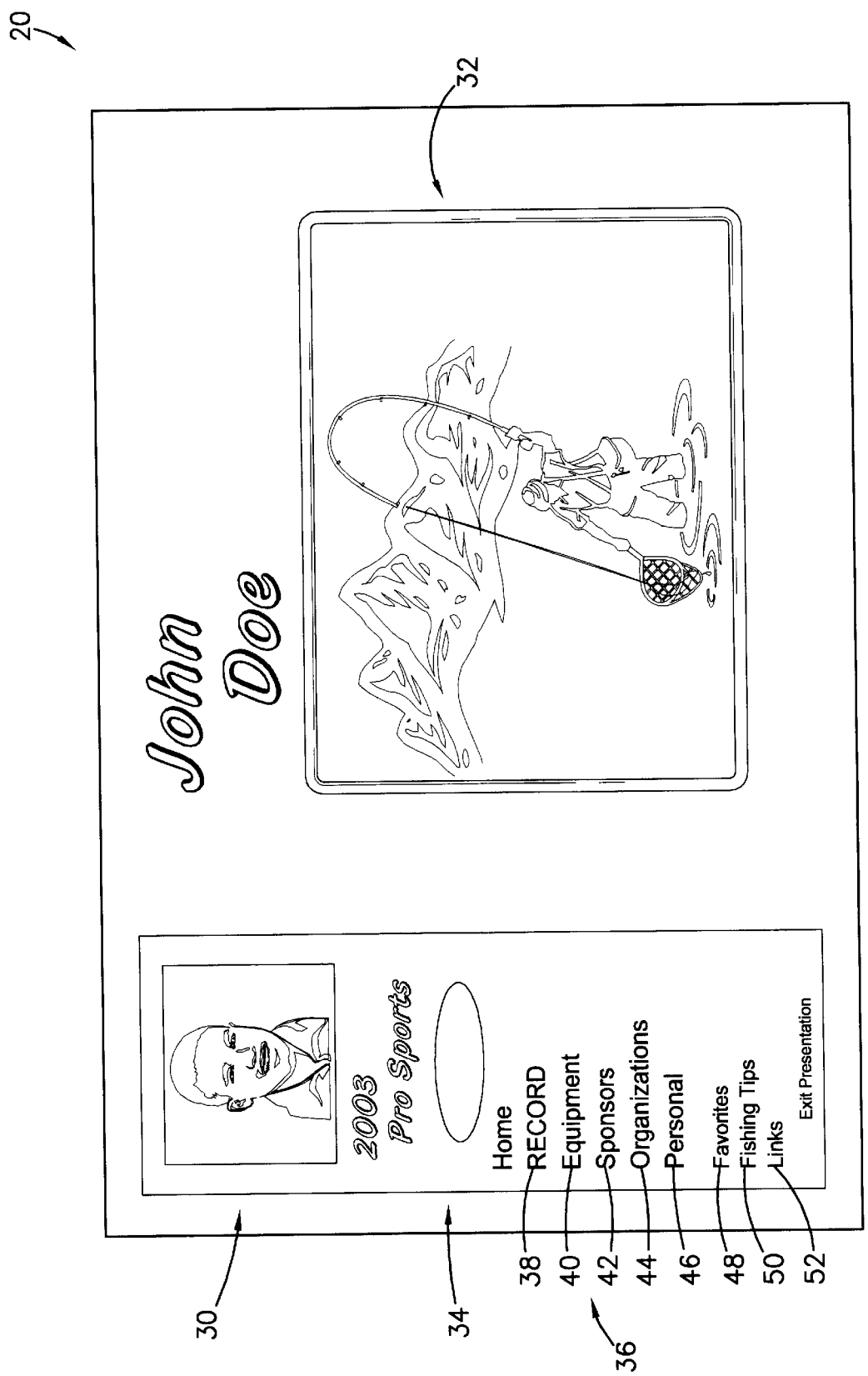
FIG. 2 is a depiction of a preferred embodiment of a Home page of a presentation of information stored on the card and communicated by the card of FIG. 1.
Figure 3:
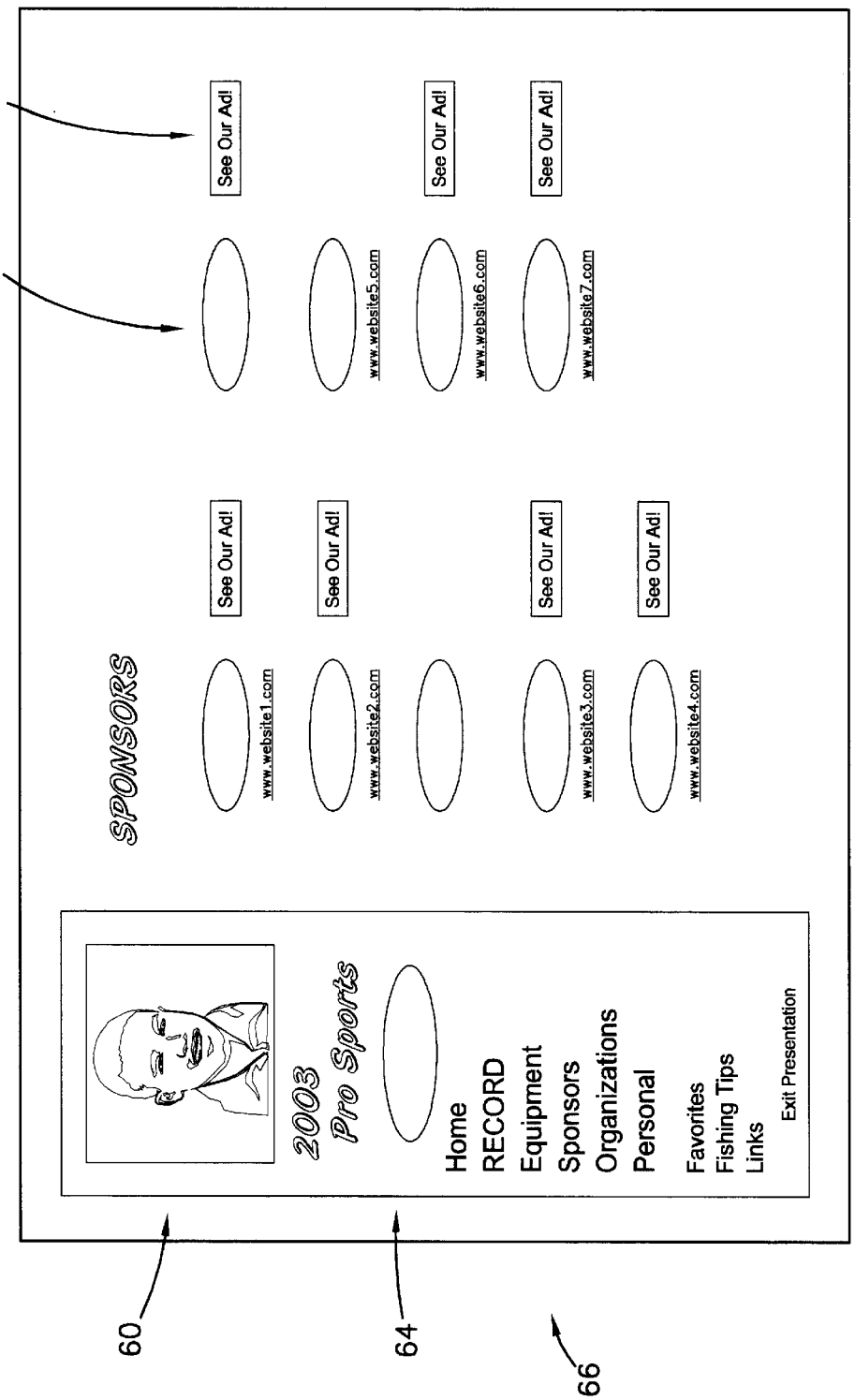
FIG. 3 is a depiction of a preferred embodiment of a Sponsors page of the presentation of information stored on the card and communicated by the card reader of FIG. 1.

FIGS. 2 and 3 illustrate a portion of an exemplary presentation of the information of the information set which might be stored on the card 10. The presentation takes the form of a number of "pages", including a Main or Home page 20 (FIG. 2) and a Sponsor page 22 (FIG. 3). Other pages in this presentation include a Record page; an Equipment page; a Sponsors page; an Organizations page; a Personal page; a Favorites page; a Tips page; and a Links page. These pages, it will be appreciated, correspond roughly to the information subsets discussed above; and each page may include any number or combination of the various media elements discussed above.

The Home page 20 is the primary page to which the presentation defaults, particularly upon initial startup. The Home page 20 includes a still photograph 30 of the subject; a video movie clip 32 with audio accompaniment of the subject in action; an advertisement hyperlink 34 to an advertiser's Internet website; and a menu 36 of selectable links to the other pages of the presentation, including a Record link 38; an Equipment link 40; a Sponsors link 42; an Organizations link 44; a Personal link 46; a Favorites link 48; a Tips link 50; and a Links link 52.

Selection of the Record link 38 will cause to appear a presentation page setting forth information contained in the performance subset discussed above. Selection of the Equipment link 40 will cause to appear a presentation page setting forth information in the equipment subset discussed above. Selection of the Sponsors link 42 will cause to appear the Sponsor page 22 of FIG. 3. Selection of the Organization link 44 will cause to appear a presentation page setting forth information related to organizations, such as, for example, clubs, associations, and agencies, related to the subject of the card 10 or to which the subject belongs. Selection of the Personal link 46 will cause to appear a presentation page setting forth information contained in the biographical subset discussed above. Selection of the Favorites link 48 will cause to appear a presentation page of hyperlinks to Internet-accessible or other network-accessible external sources of information recommended by the subject of the card 10. Selection of the Tips link 50 will cause to appear a presentation setting forth the information contained in the performance tips subset discussed above. Selection of the Links link 52 will cause to appear a presentation page of hyperlinks to Internet-accessible or other network accessible external sources of interesting or relevant information not necessarily recommended by the subject but useful nonetheless.

The Sponsors page 22, for example, sets forth the information contained in the sponsorship subset. As illustrated, the Sponsors page 22 includes a still photograph 60 of the subject; an advertisement hyperlink 64 to an advertiser's Internet website; a copy of the menu 66 of selectable links to the other pages of the presentation; and a plurality of hyperlinks 68 to Internet-accessible or other network-accessible websites maintained by one or more sponsors of the subject of the card 10. The Sponsors page 22 may also include links 70 to sponsor advertisements stored on the card 10, wherein such advertisements are accessible without connection to the Internet or another network.

Referring again to FIG. 1, the card 10 is preferably stored, when not in use, in a paper or plastic sleeve 74. As desired, the sleeve 74 may present one or more graphics and text related to the subject of the card. Thus, for example, where the subject is a football player, the sleeve 74 may present a picture of the player on a front side and current-year performance statistics on a back side. Similarly, where the subject is an automobile, the sleeve 74 may present a picture of the automobile on the front and performance and availability statistics on the back. Furthermore, because the card 10 is approximately the same size as prior art trading cards, existing materials designed for use with prior art trading cards, such as, for example, individual and sheets of protective clear plastic sleeves and card holders or bins, can be used with the card 10 of the present invention.

Furthermore, it is anticipated that the card 10 may be sold individually or in sets. Such sets may take the form of two to four cards 10 packaged in a foil wrapper, or up to twenty cards 10 packaged in a box.

As mentioned, the card 10 is playable using substantially any conventional CD-ROM/DVD drive or player, such as might be found, for example, in a commonly available desktop or portable computer or in a commonly available standalone CD-ROM/DVD player. Alternatively, in the interests of convenience, portability, and tradeability, the hand-held portable card reader 12 may be used to retrieve and communicate the information stored on the card 10. Such a reader 12 substantially enhances tradeability by allowing traders and collectors to play the card 10 virtually anywhere, including, for example, street corners, playgrounds, stores, and convention floors.

In a preferred embodiment, the reader 12 comprises a housing 80; a CD-ROM/DVD player 82; a plurality of controls 84; a display screen 86; a speaker 88; an input mechanism 90; a network port 92; and a power plug 94. The housing 80 is operable to protectively house and enclose other components of the reader 12. As such, the housing 80 is preferably constructed of a lightweight impact-resistant material, such as, for example, plastic or carbon fiber. As desired, the housing 80 may be shaped, colored, or otherwise decorated to indicate some aspect of the subject of the card 10. For example, where the subject is football, the housing 80 may be provided with the color and logo of a particular football team.

The CD-ROM/DVD player 82 is operable to receive the card 10, to retrieve the information stored thereon, and to provide the retrieved information to the display screen and the speaker for presentation. The CD-ROM/DVD player 82 may be any substantially conventional and commonly available drive or player which, due to space and portability considerations, is preferably limited to receiving and playing only miniature CD-ROMs or DVDs and not the full-sized embodiments thereof.

The plurality of controls 84 are operable to allow a user to control the reader's functionality. Any number of controls 84 may be provided corresponding to any desired functions and degree of functionality. As illustrated, the controls 84 may include a POWER button or switch 98 and an EJECT button or switch 100. The POWER button 98 is operable to turn the reader on and off, as desired. The EJECT button 100 is operable to eject a card 10 received within the CD-ROM/DVD player 82 so that the card 10 may be removed from the reader 12.

The display screen 86 and the speaker 88 are both substantially conventional and commonly available devices operable to cooperate to both visually and audibly communicate the presentation of the information retrieved and provided by the CD-ROM/DVD player 82.

The input mechanism 90 is operable to provide input related to controlling and navigating the presentation of the information. Thus, for example, the input mechanism 90 may be any substantially conventional input mechanism, such as, for example, a touch pad or trackball, operable to position and otherwise control a virtual pointer appearing on the display screen and to input a user selection. As illustrated, for example, the input mechanism 90 is a touchpad-type device including a touch-sensitive surface and one or more selection buttons. Movement of an object, such as, for example, a finger or a pointer, on the touch-sensitive surface results in corresponding movement of the virtual pointer on the display screen, and actuation of the selection button results in selection of an item, such as, for example, a hyperlink, to which the virtual pointer is pointing.

The network port 92 provides a connection point for connecting the reader 12 to a network, such as, for example, the Internet. Such a connection is not necessary to use of the reader 12 and presentation of the information, but is necessary for utilization of Internet-accessible or other network accessible hyperlinks which may be included in the presentation. Alternatively or additionally, an antenna 96 may be included to allow for a wireless means of connecting to the network.

The power plug 94 provides a connection point for connecting an external power source to the reader for providing power thereto. Preferably, the reader 12 includes an internal rechargeable power source (not shown), such as, for example, batteries, as well, such that the power plug 94 provides a mechanism for supplementing such internal power.

Figure 4:
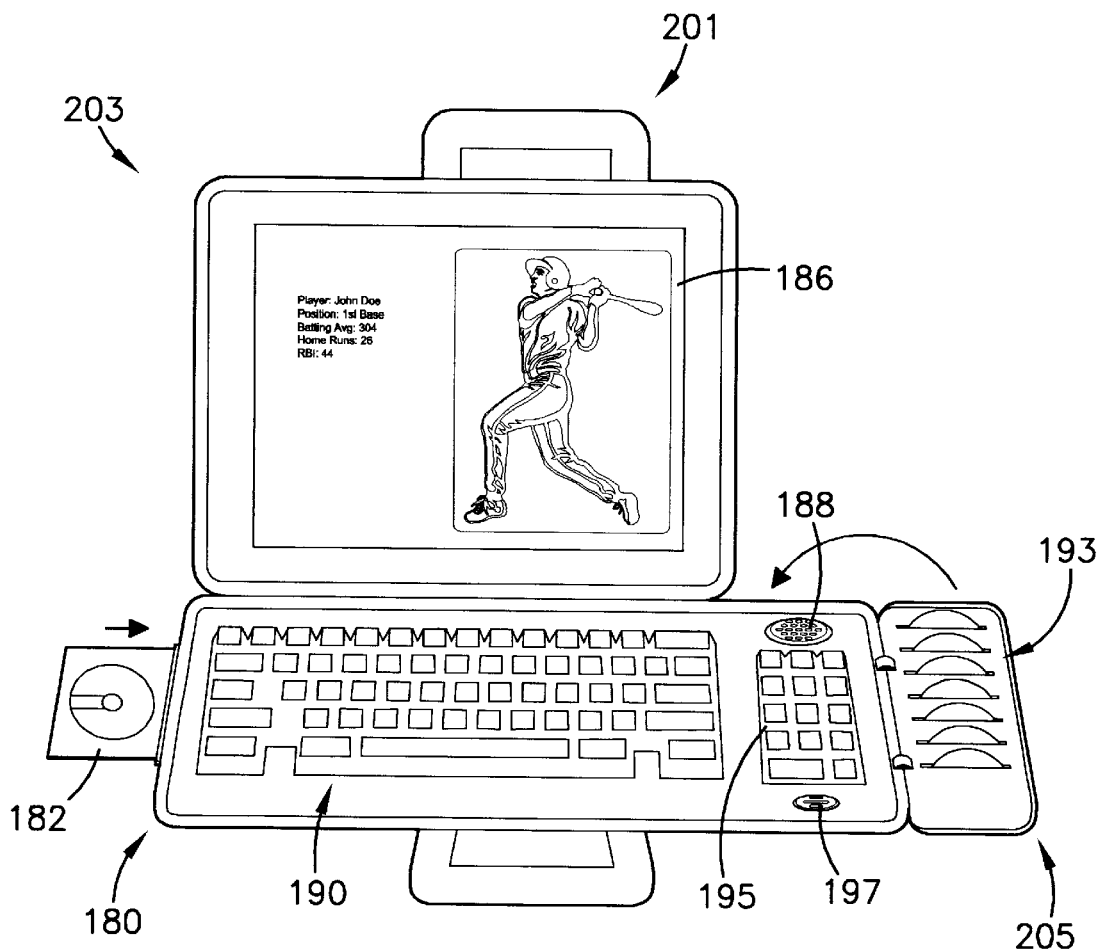
FIG. 4 is a frontal view of a preferred second embodiment of the hand-held portable card reader of the present invention.

Referring to FIG. 4, a preferred second embodiment of the card reader 112 is shown operable to retrieve and communicate the information stored on the card 10. The preferred second embodiment is substantially similar to the embodiment described above, but for the differences noted below.

Broadly, the reader 112 comprises the housing 180; the CD-ROM/DVD player 182; the display screen 186; the speaker 188; the input mechanism 190; a card tray 193; an integral wireless communications device 195; and a microphone 197. The housing 180 is substantially similar to that described above, but further includes an integral carrying handle 201, a first hinged portion 203, and a second hinged portion 205. The display screen 186 is incorporated into the first hinged portion 201 which is hingedly movable so that in a first position the display screen 186 is exposed for viewing and the input mechanism 190 is exposed for use, and in a second position the display 186 screen and the input mechanism 190 are protectively covered for transport or storage. Similarly, the card tray 193 is incorporated into the second hinged portion 205 which is hingedly movable so that in a first position the card tray 193 and the integral wireless communication device 195 are exposed for use, and in a second position the card tray 193 and the integral wireless communications device 195 are protectively covered for transport or storage.

The input mechanism 190 in this embodiment includes a substantially conventional alphanumeric keyboard which facilitates greater flexibility of use.

The card tray 193 is operable to receive and retain a plurality of the cards 10 in close association with the reader 112. As illustrated, the card tray 193 is incorporated into the second hinged portion 205 of the housing 180. In an alternative embodiment, however, the card tray 193 may be removably coupled with the housing 180 using, for example, a releasable mechanical fastening mechanism.

The integral wireless communications device 195 is operable both to facilitate a network connection needed to use some of the features, including the hyperlink elements, of the card 10, and to allow for conventional wireless voice communication with another person. Such voice communication, it will be appreciated, facilitates, among other things, trading or purchasing the cards 10 from other persons. The speaker 188 and the microphone 197 facilitate, in substantially conventional manners, such use of the integral wireless communications device 195.

From the preceding description, it will be appreciated that the card 10 of the present invention provides a number of substantial advantages over prior art trading cards, including, for example, allowing for substantially greater quantity and diversity of presentation of the information stored thereon. Thus, whereas prior art paper trading cards were limited to a relatively small amount of text and a few small graphics, the card 10 is able to advantageously store a detailed multimedia presentation combining a variety of media elements. Furthermore, the card's increased capacity and network connectivity advantageously allow for an advertising component and corresponding revenue which could potentially be used to offset the card's manufacturing costs. Additionally, the card 10 is approximately the same size as prior art trading cards, making it conveniently portable, enhancing its tradeability, and allowing for its use with existing materials designed for use with the prior art trading cards, such as, for example, individual and sheets of protective clear plastic sleeves and card holders or bins. Additionally, the card 10 is advantageously accessible using any conventional computer-based CD-ROM drive, such as might be found, for example, in a commonly available desktop or portable computer. Additionally, in order to enhance convenience of use and tradeability, the information stored on the card can be advantageously retrieved and communicated using the hand-held portable card reader 12.

Although the invention has been described with reference to the preferred embodiment illustrated in the attached drawings, it is noted that equivalents may be employed and substitutions made without departing from the scope of the invention as recited in the claims. Thus, for example, though described herein as being based upon an electronic date storage medium in the form of a CD-ROM or DVD nature, the card 10 may utilize substantially any suitable electronic data storage medium.

Having thus described the preferred embodiment of the invention, what is claimed as new and desired to be protected by Letters Patent includes the following:

What is claimed is:

1. An electronic trading card comprising:
    a storage medium measuring no more than between approximately 3.00 inches and 3.25 inches in length, no more than between approximately 2.30 and 2.70 inches in width, and no more than between approximately 0.01 inch and 0.1 inches in thickness;
    an information set of information stored on the storage medium in a retrievable electronic form, wherein the information is related to a single specific subject and includes
        at least one video movie element showing the subject,
        at least one audio element related to the subject,
        at least one still element showing the subject,
        at least one text element setting forth facts relating to the subject, and
        at least one hyperlink element providing a link to an external source of information relating to an aspect of the subject; and
    wherein the storage medium is provided with a shape associated with an aspect of the subject.

2. The electronic trading card as set forth in claim 1, wherein the subject is selected from the group consisting of: a single person, a single thing, a single place, a single athlete, a single entertainer, a single politician, a single vehicle, a single country, a single city, a single animal.

3. The electronic trading card as set forth in claim 1, wherein the storage medium is a miniature compact disk.

4. The electronic trading card as set forth in claim 1, wherein the storage medium is a miniature digital video disk.

5. The electronic trading card as set forth in claim 1, further including a sleeve for selectively storing the storage medium wherein the sleeve resembles a traditional playing card and includes at least one picture showing the subject.

6. The electronic trading card as set forth in claim 1, wherein at least some of the information of the information set is stored on the storage medium in a compressed state.

7. The electronic trading card as set forth in claim 1, wherein the information set includes at least one advertising element.

8. An electronic trading card comprising:
    a storage medium measuring no more than between approximately 3.00 inches and 3.25 inches in length, no more than between approximately 2.30 and 2.70 inches in width, and no more than between approximately 0.01 inch and 0.1 inches in thickness; and
    an information set of information stored on the storage medium in a retrievable electronic form, wherein the information is related to a single specific person and includes
        a biographic subset of information relating to at least a portion of a life of the person,
        an equipment subset of information relating to one or more pieces of equipment used by the person,
        a sponsorship subset of information relating to one or more corporate sponsors of the person,
        a performance tips subset of information relating to a performance enhancing tip suggested by the person,
        at least one video movie element showing a performance of the person,
        at least one audio element related to the specific person,
        at least one still picture element showing the person,
        at least one text element setting forth facts related to the person,
        at least one hyperlink element providing a link to an external source of information relating to an aspect of the person, and
        and at least one advertising element.

9. The electronic trading card as set forth in claim 8, wherein the storage medium is a miniature compact disk.

10. The electronic trading card as set forth in claim 8, wherein the storage medium is a miniature digital video disk.

11. The electronic trading card as set forth in claim 8, wherein the storage medium is provided with a shape associated with an aspect of the person.

12. The electronic trading card as set forth in claim 8, wherein at least some of the information of the information set is stored on the storage medium in a compressed state.

13. An electronic trading card system comprising:
a plurality of electronic trading cards, wherein each of the electronic trading cards includes
 a storage medium measuring no more than between approximately 3.00 inches and 3.25 inches in length, no more than between approximately 2.30 and 2.70 inches in width, and no more than between approximately 0.01 inch and 0.1 inches in thickness, and
 an information set of information stored on the storage medium in a retrievable electronic form, wherein the information is related to a single specific subject and includes
  at least one video movie element showing the subject,
  at least one audio element related to the subject,
  at least one still element showing the subject,
  at least one text element setting forth facts relating to the subject,
  at least one hyperlink element providing a link to an external source of information relating to an aspect of the subject, and
  and at least one advertising element;
a card reader adapted to retrieve and communicate the information set of each of the electronic trading cards, the card reader including
 a hand-held portable housing,
 a player adapted to removably receive one of the electronic trading cards,
 a display screen and a speaker adapted to visually and audibly communicate the information set stored on the removably received one of the electronic trading cards,
 an input mechanism adapted to allow a user to navigate the information set communicated by the display screen and the speaker, and
 a network connection adapted to selectively connect the card reader to a network wherefrom additional information relating to the subject is available; and
a plurality of sleeves, each sleeve resembling a traditional playing card operable to selectively store a selected one of the electronic trading cards, and including at least one picture showing the subject of the selected electronic trading card.

14. The electronic trading card system as set forth in claim 13, wherein the subject is selected from the group comprising: a single person, a single place, a single thing, a single athlete, a single entertainer, a single politician, a single vehicle, a single country, a single city, a single animal.

15. The electronic trading card system as set forth in claim 13, wherein the storage medium is a miniature compact disk.

16. The electronic trading card system as set forth in claim 13, wherein the storage medium is a miniature digital video disk.

17. The electronic trading card system as set forth in claim 13, wherein the storage medium is provided with a shape associated with an aspect of the subject.

18. The electronic trading card system as set forth in claim 13, wherein at least some of the information of the information set is stored on the storage medium in a compressed state.

19. The electronic trading card system as set forth in claim 13, wherein the player is a CD-ROM/DVD player.

20. The electronic trading card system as set forth in claim 13, wherein the network connection of the card reader is a wireless network connection.

21. The electronic trading card system as set forth in claim 13, wherein the input mechanism is a touchpad.

22. The electronic trading card system as set forth in claim 13, wherein the input mechanism is a track ball.

23. The electronic trading card system as set forth in claim 13, wherein the card reader is provided with an appearance associated with an aspect of the subject.

24. The electronic trading card system as set forth in claim 13, further including a card tray which is physically associated with the hand-held portable housing and operable to receive and retain a number of the plurality of the electronic trading cards.

* * * * *